(12) United States Patent
Kaczorowski

(10) Patent No.: US 7,913,977 B2
(45) Date of Patent: Mar. 29, 2011

(54) HANDLE WITH A RATCHET MECHANISM TIGHTENING A TAPE WINDING IT AROUND AN OBJECT

(76) Inventor: Wladyslaw Kaczorowski, Warsaw (PL)

( * ) Notice: Subject to any disclaimer, the term of this patent is extended or adjusted under 35 U.S.C. 154(b) by 331 days.

(21) Appl. No.: 11/453,380

(22) Filed: Jun. 14, 2006

(65) Prior Publication Data
US 2007/0289112 A1 Dec. 20, 2007

(51) Int. Cl.
*B25B 25/00* (2006.01)
(52) U.S. Cl. ....... 254/218; 254/217; 254/250; 24/69 ST; 24/70 ST
(58) Field of Classification Search ................. 254/217, 254/218, 250; 24/69 R, 70 ST, 69 ST, 69 CT
See application file for complete search history.

(56) References Cited

U.S. PATENT DOCUMENTS

| | | | | |
|---|---|---|---|---|
| 588,268 A | * | 8/1897 | David | 24/271 |
| 3,475,793 A | * | 11/1969 | Oetiker | 24/20 R |
| 4,268,012 A | * | 5/1981 | Ruehle et al. | 254/223 |
| 4,604,772 A | * | 8/1986 | Arff | 24/68 R |
| 5,271,606 A | * | 12/1993 | Kamper | 254/217 |
| 5,494,387 A | * | 2/1996 | Ruegg | 410/103 |
| 6,163,935 A | * | 12/2000 | Hinkey | 24/71 TD |
| 6,327,752 B1 | * | 12/2001 | Hinkey | 24/115 M |
| 6,547,218 B2 | * | 4/2003 | Landy | 254/217 |
| 6,711,786 B2 | * | 3/2004 | Mamie et al. | 24/68 CD |
| 6,808,164 B2 | * | 10/2004 | Chang | 254/217 |
| 7,032,415 B2 | * | 4/2006 | Young | 70/18 |
| 7,293,760 B1 | * | 11/2007 | Chang | 254/218 |
| 7,350,767 B2 | * | 4/2008 | Huang | 254/218 |
| 7,374,152 B2 | * | 5/2008 | Ruan | 254/217 |

* cited by examiner

Primary Examiner — Emmanuel M Marcelo

(57) ABSTRACT

The present invention is briefly named "The tightener" for fastening a selected securing member around an object and carrying it comprising a set of two independent devices. One of them is an ordinary clamp being in common use everywhere in the world with a strap permanently attached to it and said clamp is modified to enable connecting it with a tightening device and named a jamming clamp to distinguish one clamp from the other. The tightening device comprises a shaft with its ends and with a ratchet mechanism is mounted in a two-arms handle. Said handle operating as a lever of the ratchet mechanism turning said shaft. The securing member exiting the jamming clamp is initially pulled by hand then is pulled by winding it onto the shaft turned by said ratchet mechanism to reach needed tension in said securing member, which is the main idea of the invention and it is impossible to attain said task by pulling said securing member only by hand, automatically jammed in said jamming clamp when the pulling of it is stopped. The handle is detached if an object is prepared for transportation only, not for carrying it.

8 Claims, 4 Drawing Sheets

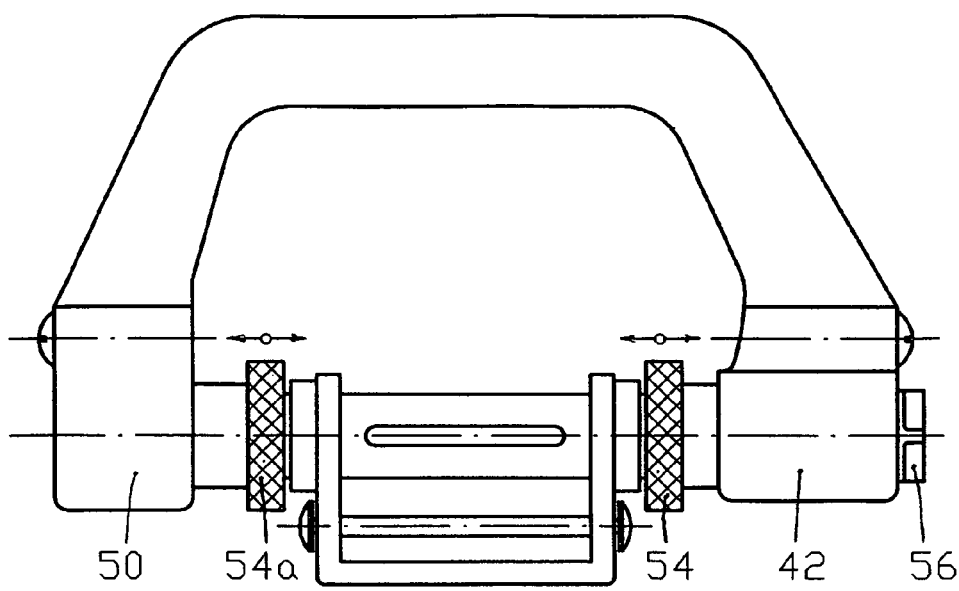
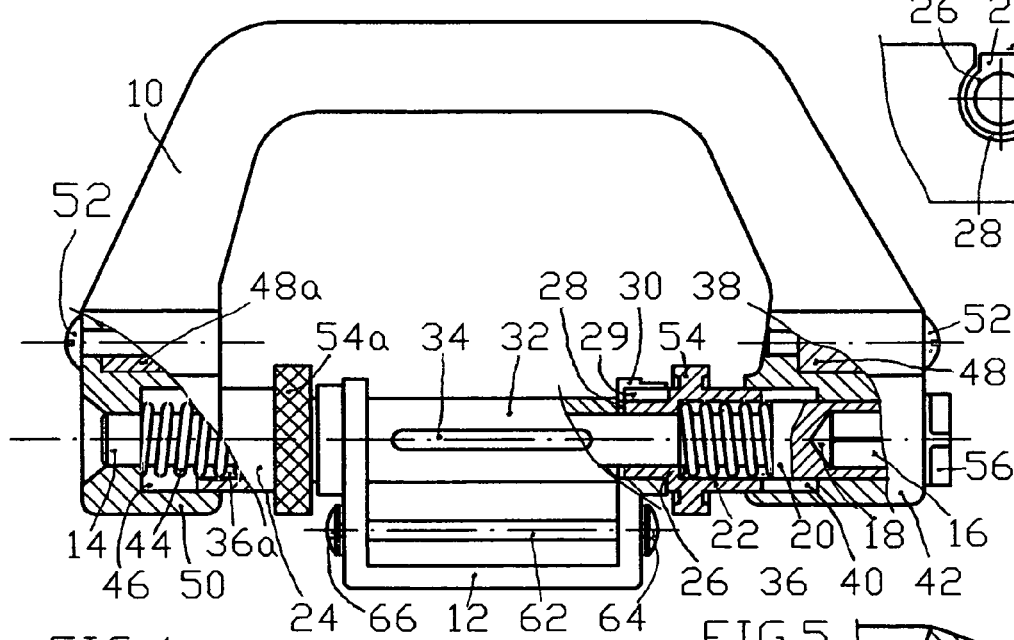
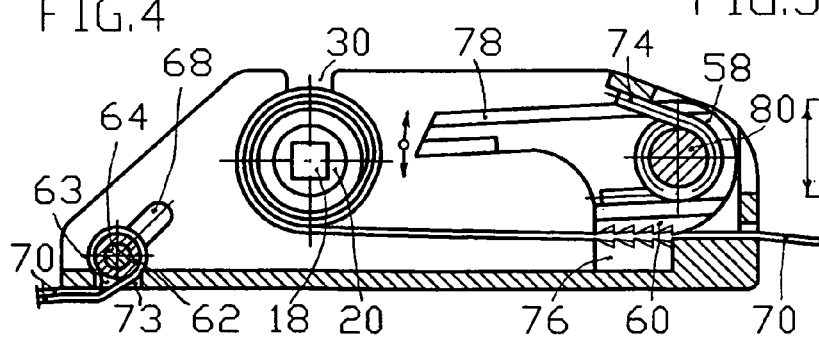
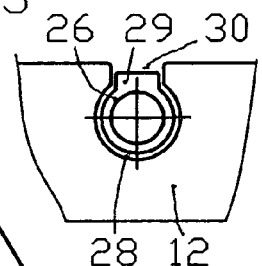
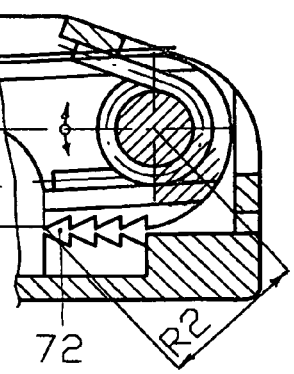

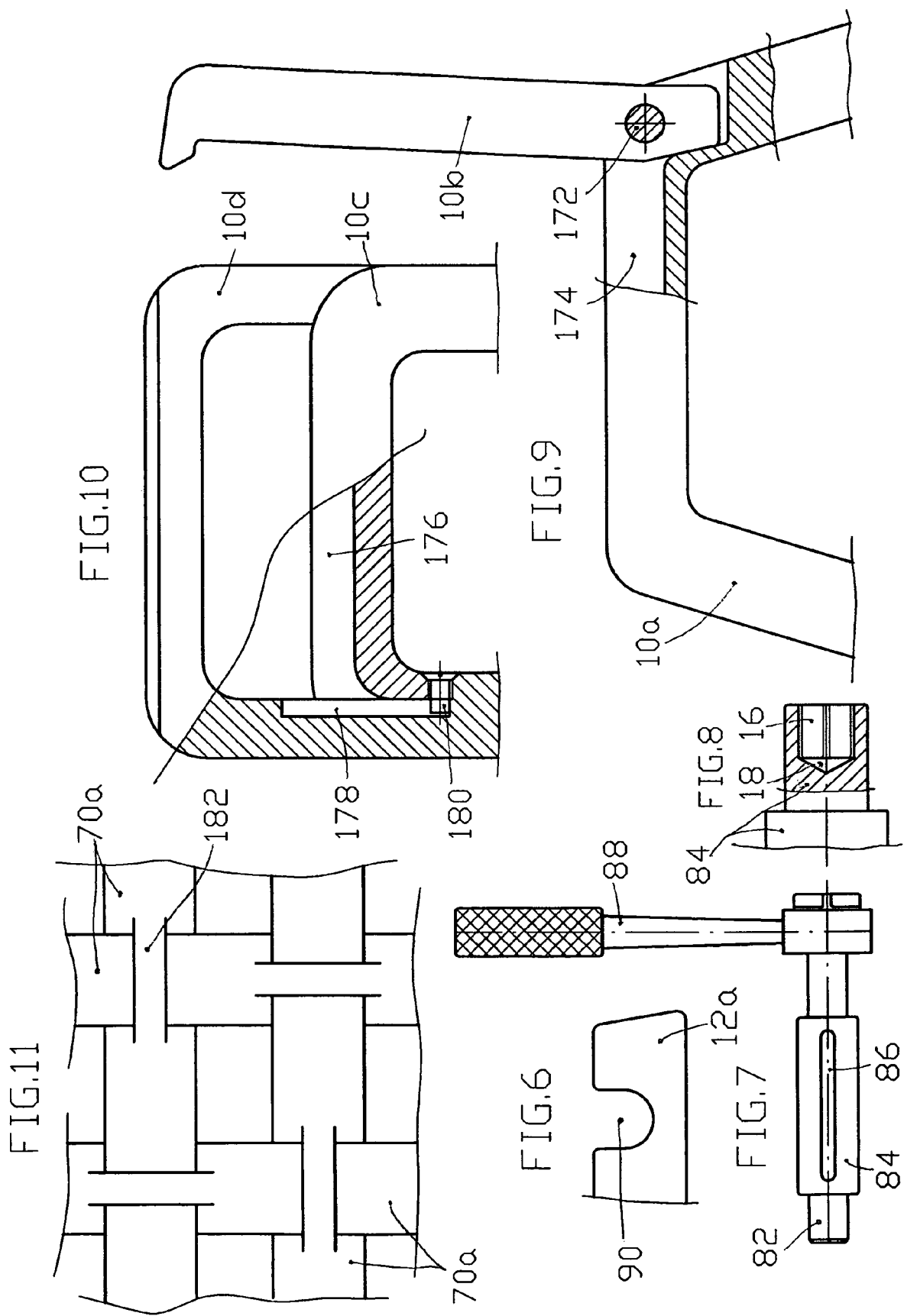

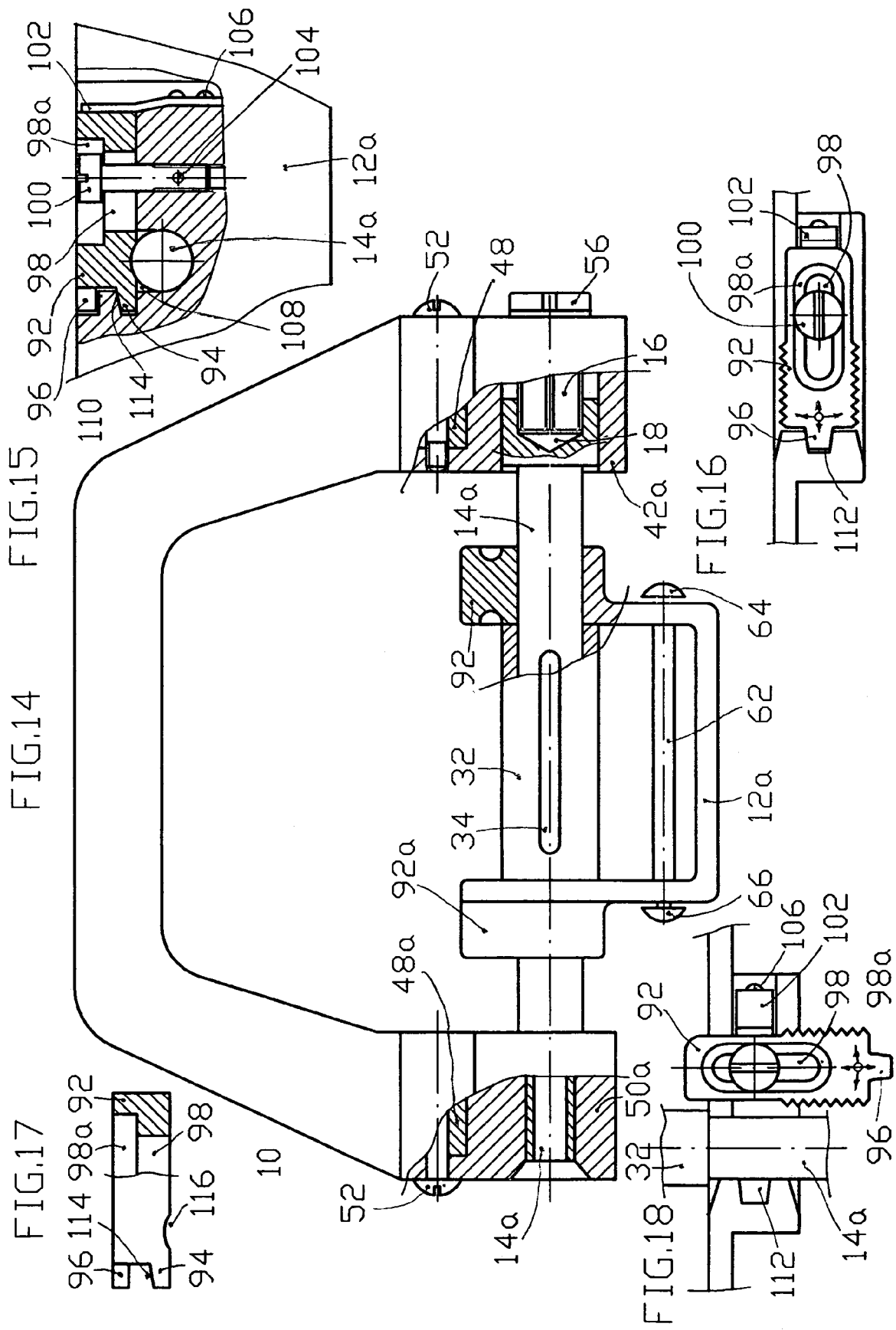

HANDLE WITH A RATCHET MECHANISM TIGHTENING A TAPE WINDING IT AROUND AN OBJECT

FIELD OF THE INVENTION

This invention relates to a device for fastening, fixing, or binding a securing member around a variety of goods of different shapes and dimension. It especially relates to a device allowing universal, practical, end effective use for closing or securing goods such as suitcases, luggage-carriers, or in case of damage of luggage or goods during transportation.

BACKGROUND OF THE INVENTION

A variety of devices exist for fastening a securing member about packs, boxes, etc. Those devices, used while preparing goods for transportation, are typically steel or plastic tape. Special devices are used for the purpose of tightening such a securing member. Often these special devices are structure fixed to a means of transportation and are of no use for general purposes. No general purpose solution to this problem exist. Rope, wire or electrical cable etc. are generally used, for example, stores frequently provide rope to customers to fasten merchandise on top of their cars. Tighteners with a tape exist on the market, but said tape is tightened by pulling it with hand only, automatically jamming said tape when pulling it is stopped, but not provided with a handle for carrying said goods, and without any means for increasing tension on the tape.

SUMMARY OF THE INVENTION

The present invention of which tightening the securing member is the basic function, is hereinafter called "The tightener" to avoid using the full name of said invention described below. The tightener solves the problems existing in the prior art, by providing a tightener means for use with a variety of securing members for many different purposes. The present invention allows to ensure strong or light binding, fastening and preparing luggage or merchandise for transportation.

Another object of the present invention is to provide a tightener of simple construction for universal utility consisting of a few pieces made of common materials, such as steel, plastic, which makes the cost of production very low, implying mass production, but using present day materials for functioning loaded parts would allow to produce said investion of smaller size and less of weight. Only the handles should be of suitable size.

A further object of the present invention is to provide a tightener which is simple, easy to use and reliable.

One more object of the present invention is to provide a tightener which connects the two endings of a securing member, with the strength which can be regulated according to needs and desires because the securing member can be stopped and locked at any of a variety of positions A still further object of the present invention is to provide a tightener means which allows for fast changing of the tape for another one of different length and thickness according to needs, even for an ordinary string or set of strings.

A succesive object of the present invention is to provide it with means which allows the tightener to be used as an auxiliary device for popular jamming clamps with the tape being in common use as mentioned above, enabling to achieve much greater increase of the tightening strength applied to the tape, which in normal use is pulled dirrectly by hand only.

The tightener is made of U-shaped bed plate put on the object around which the securing member is to be fastened. The present invention is formed and acts as an auxiliary device provided with means named "The tightening device" temporarily connecting with the bed plate of the tightener. It enables preparing goods and merchandise for transportation, as well as carrying a bound object. Such structure of the tightener with enables using many tighteners with independent means maintaining only the securing member in tensioned state. The first end of the securing member is secured to the tightener's bed plate and the second one is threaded through a slot made across the shaft between both sides of the bed plate. The sewing together of the first end of the tape with its next part creates an eylet through which is slid a bolt which with its ends is placed in slideways made in both sides of the tightener bed plate and said slideways are inclined towards the bed plate bottom. Said bolt with a knurled sleeve slid over said bolt allows for very fast changing of the tape into another one of different length or thickness, or into an ordinary string or set of strings. The end of said tape or string or set of strings folded in two is threaded through a rectangular opening made in the bed plate bottom. Pulling said end of the tape, the string or set of strings causes movement of the bolt with said knurled sleeve towards the bottom of the bed plate along slideways causing automatical jamming of the tape, string or set of strings between the knurled sleeve and edges of said rectangular opening. A jamming clamp being in common use and modified to be a part of present invention constitutes a device maintaining the securing member in tensioned state. The ratchet wrench built-in the handle's arm and connected with the shaft constitute the tightening device winding onto said shaft the securing member. Said tightening device is disconnected from the tightener bed plate, i.e. from the jamming bed plate, as a device completely unnecessary during transportation. In effect, the said structure of the tightener enables using unlimited tighteners with means maintaining only the securing member in tensioned state for the duration of the transportation, and one tightening device only. By comparing said tighteners with heavy duty steel ratchets being in common use at present it is as though every nut or screw would be permanently coupled with the wrench, for example in a car, tractor, harvester, bicykle etc., because every heavy duty steel ratchet is provided with the lever including ratchets being its integral parts, operating as said tightening device.

The present invention using the jamming clamp allows to use a ratchet or even ordinary wrenches to turn the shaft while preparing luggage or goods for transportation. Moreover, said wrenches can be used as with extension rods when, for example, too little space exists between items of transported goods to put into swinging motion the arm of said wrench, or the handle of the present invention. The handle is put in the swinging motion, working as a lever actuating the ratchet wrench which turns the shaft winding onto itself the securing member. Simultaneously the said handle is used for carrying the bound object it ensures wrapping of said object, comfort and convenience. The present invention provided with the jamming clamp and designed for transportation of goods, merchandise etc., only can simply use only a shaft winding onto itself the securing member, coupled with a ratchet or ordinary wrench or being the integral part of said wrench. Said shaft seated in U-shaped cuts formed in the side walls of the jamming clamp bed plate only for the time of pulling the securing member exiting the jamming clamp. The present invention can be used as said heavy duty steel ratchet for restraint of load during transportation, for example containers, boxes, cars, tractors etc. Instead of one securing member two parts of the securing member put to use, the ends of which are provided with arresting hooks and one of their opposite ends is attached to the bed plate, the other one is tightened by the tightening device, winding it on the shaft. Very important and essential is the difference between the jamming clamp of the present invention and jamming clamps being in common use. Lifting up the longer arm of the jamming clamp's pressure pad makes bigger the passage between the knurled ending of said pressure shorter arm and the same knurled edge of the tightener bed plate in which the securing member is jammed. In effect, said operation makes the securing member free. Said solution excludes the possibility of any accidental lifting up of the pressure pad's longer arm because it is placed between the side walls of the jamming clamp bed plate. Said operation is realised by jamming clamps being in common use in the opposite direction. The longer arm of the pressure pad is pressing down towards the bottom of the jamming clamp bed plate. All the time, in said devices being in common use there exists a risk of accidental pressing down of said longer arm of the pressure pad.

DETAILED DESCRIPTION OF THE DRAWINGS

FIG. 1 represents a general view of the tightener adapted to be used as auxiliary tightener with the use of a jamming clamp and a ratchet wrench.

FIG. 2 represents a partial cross section of the tightener of FIG. 1.

FIG. 3 represents a view of the method of the connection of the tightening device with the tightener bed plate.

FIG. 4 represents a longitudinal cross section of the tightener bed plate, i,e, the jamming bed plate.

FIG. 5 represents a cross section of the pressure pad of the jamming clamp.

FIG. 6 represents a side view of the jamming clamp bed plate with cut for placing in the shaft of the ratchet wrench.

FIG. 7 represents a general view of the ratchet wrench with the shaft placing in the cuts in side walls of the jamming clamp bed plate.

FIG. 8 represents a cross sectional view of the shaft's end with the dead hole in it for putting in the working tip of the ratchet wrench.

FIG. 9 represents a partial longitudinal cross section of the tightener's handle with the lever elongating said handle.

FIG. 10 represents a partial longitudinal cross section of the tightener's handle with the cover plate elongating the handle, movable up and down.

FIG. 11 represents a set of tapes interlacing each other, for fastening it around an object of any shape.

FIG. 14 represents the enlarged drawing of FIG. 2 with the use of locking cover plates maintaining the shaft placed in the cuts of the jamming clamp bed plate in position.

FIG. 15 represents structure using said locking cover plates shown in FIG. 14.

FIG. 16 represents a general view of FIG. 14 looking in the direction of arrow A.

FIG. 17 represents the side view of the locking cover plate with a partial cross section showing its channel.

FIG. 18 represents the locking cover plates in opened position allowing the shaft to be put in and taken out from the cuts of the jamming clamp bed plate.

DETAILED DESCRIPTION OF THE PREFERRED EMBODIMENTS

Figure 13:
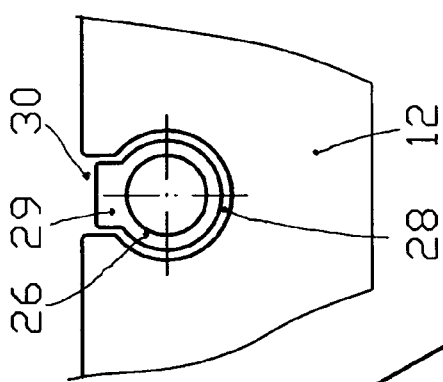
FIG. 13 represents the enlarged drawing of FIG. 3
Figure 12:
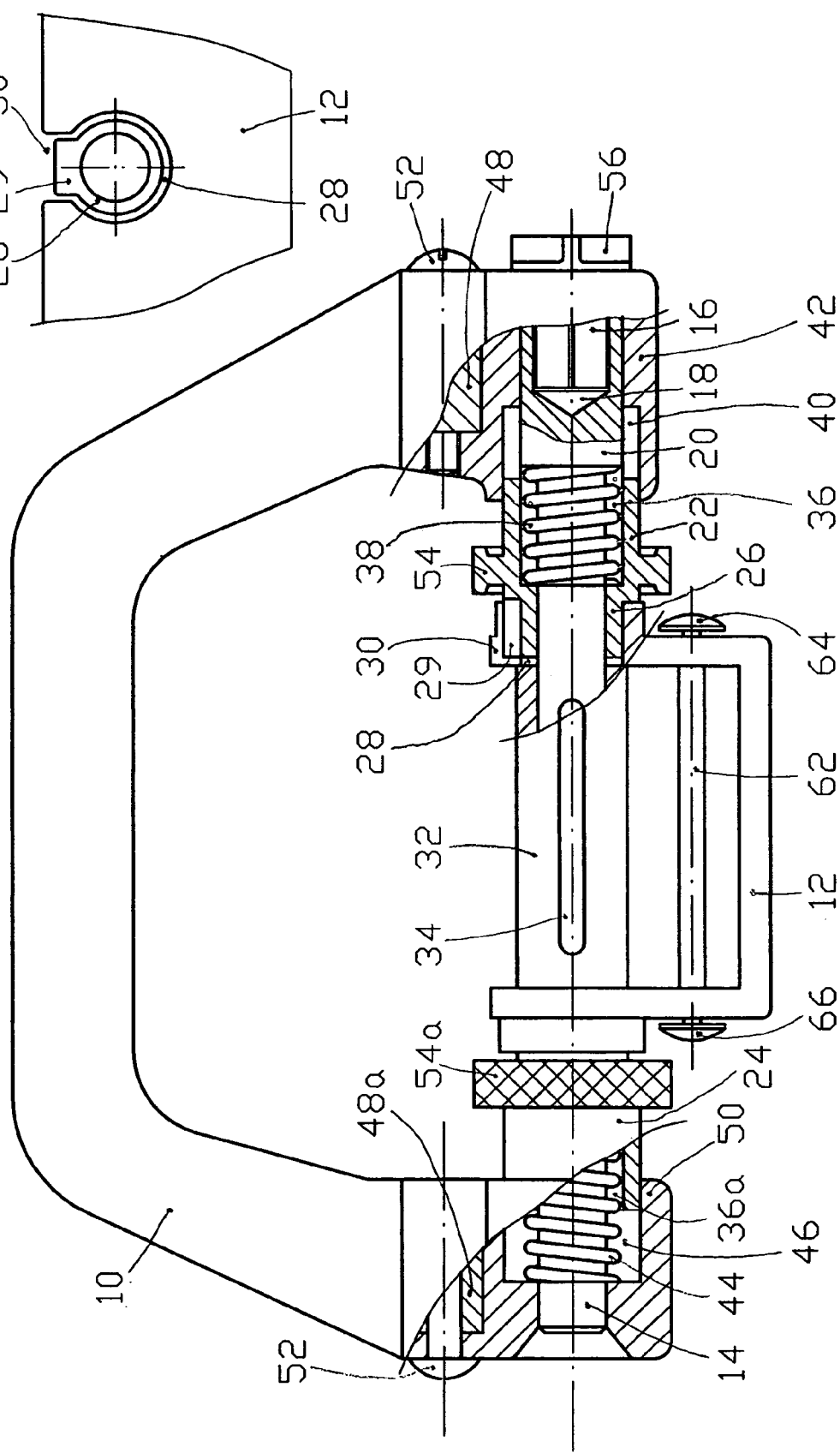
FIG. 12 represents the enlarged drawing of FIG. 2.

FIG. 1 shows the present invention, called "The tightener" as auxiliary device, in general view with the jamming clamp in use. FIG. 2 shows it in partial sections details. The handle 10 provided with a ratchet wrench mounted inside its body 42 attached to one of the handle arms, or can be constituting the integral part of said arm. The handle 10 with its means which are tightening the securing member called below "The tightening device" is connecting with the tightener bed plate for the process of tightening the securing member. The name "The tightener bed plate" 12 is in this description tantamount to the name "the jamming clamp bed plate" in case of using the jamming clamp. A head bar 64 with its ends located in and movable along the channels 68 operating as slideways shown in FIG. 4, made in the bed plate's sides, and inclined towards said bed plate's bottom. The bar's 64 end protruding from the slideway 68 is prevented from slipping out of said slideway by a self-locking nut 66 screwed on said end of the bar 64. A knurled sleeve 62 slid over the bar 64 and simultaneously slipped through an eyelet 63, shown in FIG. 4 which is the first end of the tape and created by folding it in two around said sleeve 62 then by seving or riveting said end of said tape with its next section. In case of changing said tape for any other one or even ordinary string or set of strings, said eylet is created by folding the end of any said securing member without sewing or riveting, then slipped through a rectangular opening 73 in the bed plate bottom. The handle 10 with the ratchet wrench is left in connected position with the tightener bed plate if the fastened object will be carried. The handle 10 put into swinging motion by hand actuates the ratchet wrench mounted in the body 42 hereinafter called "The ratchet wrench housing" is attached to the arm of the handle 10. Said handle is connected with the shaft 14 by the working tip 16 of the ratchet wrench which turns the shaft 14. Said working tip 16 is placed in the dead hole 18 made in the head 20 of the shaft 14. Said dead hole 18 is of the shape and size similar to said working tip 16. The shaft 14 is rotationally seated in the tube 22 which in turn with its cylindrical external ending slips into one of the two dowel holes 28 formed on both sides of the jamming clamp bed plate 12. The opposite end of the shaft 14 is seated in identical way as described above inside the tube 24 which is identical as the tube 22 and in the same way slipped into opposite dowel hole 28. The distal ending of the shaft 14 is turnably seated in a hole made in the bottom of the dead hole 46 which in turn is made in the body 50 attached to the arm of the handle 10. Said body hereinafter called "The shaft housing" 50. The sleeve 32 placed between side walls of the jamming clamp bed plate 12 is slipped over the shaft 14 connected with it by using rivets or other means. Across said sleeve 32 and the shaft 14 is formed the slot 34 for threading the second end of the securing member 70 exiting the jamming clamp shown in FIGS. 4 and 5. Cylindrical hole 36 made at end of the tube 22 opposite the end slipped in dowel hole 28 of equal or a little bigger diameter as the diameter of the shaft's 14 head 20 which enables displacing of the tube 22 along said head 20 of the shaft 14. Simultaneously, suitable diameter of the bore chamber 40 made in the ratchet wrench housing 42 enables the same end of the tube 22 with its external surface to displace along said bore chamber 40. The coil spring 38 is located in the hole 36, slid over the shaft 14 and compressed between the head 20 of said shaft 14 and a ring surface created by the difference between the diameter of the hole 36 and the hole (not numbered) made in the bottom of said hole 36 being the bearing for the shaft 14. The other coil spring 44 slid over opposite end of the shaft 14 is located in the dead hole 46 made in the shaft housing 50. Said coil spring 44 is compressed between two ring surfaces. The first one is the same as for the tube 22 described above, created by the difference between the diameter of the hole 36*a* made in the tube 24 equal in the diameter of the hole 36 in the tube 22 and the diameter of the shaft 14. The hole (not numbered) made in the bottom of the hole 46 constitutes the bearing for the distal end of the shaft 14. The ratchet wrench housing 42 and the shaft housing 50 on their top surface have the niches (not numbered) which have the same shape and size as endings 48 of the handle 10 arms which are forced into said niches and are held in position by head screws 52. Said ratchet wrench housing 42 and the shaft housing 50 can be as mentioned above, the integral suitably shaped parts of the handle 10 arms. Both tubes 22 and 24 have on their external surfaces knurled collars 54 and 54a constituting their integral parts. They are designed to apply pressure to them, to compress springs 38 and 44 to uncover shaft's 14 sections to slip the tightening device with said uncovered sections of the shaft 14 in the dowel holes 28 through their channels 30. One of them is shown in FIG. 3. The reversing switch 56 being the standard equipment of ratchet wrenches, allows turning back the shaft 14 loosening a section of the securing member between said shaft 14 and the pressure pad 58 of the jamming clamp. This result in easing the disconnection of the tightening device from the jamming clamp bed plate 12. FIGS. 4 and 5 show the bed plate 12 with the jamming clamp which represents one of many types of such devices being in common use. One end of the tape is permanently attached to the bed plate of the jamming clamp and the other end of the tape fastened around an object is threaded through a passage, as well as, for example through the passage 72 shown in FIG. 5. Said tape is tightened by pulling it by hand only and automatically jammed when the pulling of it is stopped. The main detail of the jamming clamp shown in FIGS. 4 and 5 is the pressure pad 58. Its knurled, cam-shaped ending 60 of its shorter arm cooperates with the same knurled edge 76 of the jamming clamp bed plate 12. Said cam-shaped ending 60 of said pressure pad's 58 shorter arm is defined by the difference between the length of the radius R1 and the radius R2 shown in FIG. 5. Radius R1 is the distance from the axis of rotation of the pressure pad 58 to the one edge of the ending of the pressure pad 58 shorter arm and the radius R2 is the distance to the other edge of the said ending of the pressure pad 58 shorter arm. Between said knurled ending 60 of the pressure pad's 58 shorter arm and the knurled edge 76 of the bed plate 12 is created the passage 72 for threading the securing member 70. The rotation of the pressure pad 58 causes enlarging or decreasing of the passage 72 depending upon the direction of said rotation. The coil springs 74 slid over ends of the axle 80 of the pressure pad 58 constantly turn it making the passage 72 smaller, thereby jamming the securing member 70. The first end of the securing member 70 is attached to the bed plate 12 permanently or temporarily using the quick-release joint, as described above using the same details. The longer arm 78 of the pressure pad 58 by applying pressure to it from below overcoming resistance of springs 74 makes the passage 72 bigger thereby making the securing member 70 free. The direction of teeth of the pressure pad 58 shorter arm's knurled ending 60 and also the teeth of the knurled edge 76 of the bed plate 12 greatly increases the strength of the jamming effect on the securing member. The ordinary shaft 82 and the sleeve 84 slid over said shaft 82 shown in FIGS. 6, 7 and 8 can be use only in the case of using present invention with jamming clamps for transportation of any goods, merchandise, excluding carrying them. The slot 86 made across the shaft 82 and the sleeve 84 is for threading the end of the securing member and then winding it onto said sleeve 84, The shaft 82 can be integral part of the ratchet wrench or connected to it by using described above dead hole 18 formed in the end of the shaft 84 of the same shape and size as working tip 16 of the ratchet wrench 88. Said device is located with its shaft in U-shaped cuts 90 made in both sides of the tightener bed plate 12a. To make the connecting and disconnecting of the tightening device with the jamming clamp bed plate 12 much comfortable one can use the small protrusions 29 constituting the integral parts of the tube 22 and 24 ends with which are slipped in the dowel holes 28. Said protrusions 29 are of the same width as the width of the channels 30 leading to said dowel holes Compressing the coil springs 38 and 44 by applying pressure on the collars 54 and 54a causes tube 22 and 24 ends to exit the dowel holes 28, then slight rotation of the collars 54 and 54a is enough to lead said tubes against surfaces of the side walls of the jamming clamp bed plate 12 under the force exerted by the expanding springs 38 and 44. FIG. 9 shows an elongating, upon need, version of a handle 10a by introducing into use of an extra lever 10b which is pivotally attached to said handle by a pivot 172 in upright position elongating the handle 10a. The extra lever 10b in overlying position is placed in a hollow 174 on the top surface of the handle 10a. FIG. 10 shows another version of elongating the handle 10c by use of a handle-shaped cover plate 10d which overlies a working handle 10c and slipping with two arms along said working handle 10c elongating it, which allows for applying a greater torque to said working handle thereby applying it to the ratchet mechanism. Said cover plate 10d is prevented from slipping off the handle 10c by two screwed bolts 180 which are screwed in the handle's 10c arms and said screw's ends are located in leading channels 178 made in and along the internal surfaces of the cover plate's arms. Said cover plate 10d overlies the handle and is placed in a hollow 176 made on the top surface of the handle 10c and along the external surfaces of said handle arms, which are used as slideways for said cover plate 10d. FIG. 11 shows a set of tapes 70a used for present invention interlaced with each other by using numerous cuts 182 made along the middle lines of these tapes fastened one after another around any shape of given object, ensuring strong wrapping by using present invention, then used for carrying said object. FIG. 15 shows the shaft 14a placed in U-shaped cuts 108 made in the thickened sides of the jamming clamp bed plate 12a. Locking cover plates 92 are seated on the flat surfaces of the lowered sides of the U-shaped cuts 108. Head bolts 100 pass across said locking cover plates' channels and are screwed in the said lowered sides of the cuts 108 They are protected in order to avoid their accidental turning by rivets 104. The upper parts 98a of the channels 98 are widened to allow for the placement of the heads of the bolts 100. Said bolts function as axles allowing the locking cover plates 92 to turn as well as move simultaneously. This movement is alloved by the channels 98 of the locking cover plates 92. Wedge shaped protrusions 96 at the ends of the cover plates 92 fit tightly into the hollows 112 formed at the opposite sides of the cuts 108 holding said cover plates 92 in position. Adjacent to them, other protrusions 94 fit underneath of the protrusions 110 of said opposite sides of the cuts 108 and allow the object, fastened around with the securing member, to be carried. Flat springs 102 are attached to the said thickened part of the jamming clamp bed plates' sides by the use of the screws 106 or other means. These springs 102 constantly press on the locking cover plates 92 locating their protrusions 96 into the said hollows 112 with simultaneous locking of the protrusion 94 underneath of the said cuts' 108 protrusions 110. Circular shaped niches 116 formed at the lower sides of the locking cover plates 92 create bigger adhering surfaces thus closing the said locking cover plates to the shaft.

Operation of the Tightener Means

The present invention as an auxiliary device with the use of the jamming clamp. The bed plate 12 of said jamming clamp is put on the object to be secured with the securing member 70. One end of the securing member 70 is attached to the bed plate 12 permanently or by using the quick-release joint. Said end of the securing member 70 is folded in two creating the eylet 63, the said end folded in two is threaded through the rectangular opening 73 in the bottom of the jamming clamp bed plate 12. Pulling said end of the securing member 70 causes moving of the bolt 64 with its ends along the slideway 80 in both side walls of the jamming clamp bed plate 12. In effect, said end becomes jammed between edges of said opening 73 and the bolt's 64 knurled sleeve 62. Then, after girding the securing member 70 around given object, its second end is put in the passage 72 of the jamming clamp, previously opened by lifting up the longer arm 78 of the pressure pad 58. Pulling the end of the securing member 70 exiting the passage 72 causes a slight rotation of said pressure pad 58 overcoming resistance of the coil springs 74 enlarging said passage 72, enabling sliding of the securing member 70 along said passage. Simultaneously said pulling of the securing member 70 creates in result initially tension in said securing member. The passage 72 becomes bigger or smaller depending on the direction of the pressure pad 58 rotation and cam-shaped ending 60, of the pressure pad 58 shorter arm. Said cam-shaped ending of the pressure pad's 58 shorter arm is defined by different distance between the axis of rotation of said pressure pad of its shorter arm knurled ending 60, i.e. radius R1 and R2. The radius R2 is the longer one. The direction of teeth of the pressure pad's 58 shorter arm's knurled ending 60 and the same kind of teeth of the knurled edge of the jamming clamp bed plate 12 make the jamming effect of the securing member much greater. Said effect automatically increases also while pulling the securing member back because said securing member pulling the shorter arm of the pressure pad 58 after it itself makes the passage 72 smaller. The next operation is to connect the tightening device with the jamming clamp bed plate 12. This operation can be preceded by putting the end of the securing member 70 into the slot 34 of the shaft 14 and the sleeve 32 as operation to be done in a much more comfortable position than after said connection of the tightening device with the jamming clamp bed plate 12. Applying the pressure, simultaneously to both collars 54 and 54a in opposite directions of each other, compressing the springs 38 and 44 causes moving the tubes 22 and 24 thereby uncovering sections of the shaft 14. Said sections enable putting the tightening device in the dowel holes 28 through the channels 30 with said uncovered sections of the shaft 14, the diameter of which is the same or a little less than the width of said channel 30. Releasing springs 38 and 44 causes automatically the sliding of the tubes 22 and 24 ends 26 and 26a into the dowel holes 28. The tightening device in this way is connected with the tightener's bed plate 12. Putting the handle 10 into swinging motion causes actuating the ratchet wrench thereby turning the shaft 14 with the sleeve 32 winding onto itself the securing member 70, which is automatically jammed in the jamming clamp when pulling of it is stopped. Then the tightening device can be uncoupled from the jamming clamp bed plate 12, or not, if fastened object will be carried. To disconnect said tightening device from said jamming clamp bed plate, first the loosening of the part of the securing member 70 between the jamming clamp and the shaft 14 should be performed by the turning back said shaft with the ratchet wrench mounted in the handle 10 arm previously changing the position of the reversing switch 56 of said ratchet wrench. Then after uncovering sections of the shaft 14 as described above by displacing tubes 22 and 24, the tightening device is taken out from the dowel holes 28 of the jamming clamp bed plate 12. Lifting up the longer arm 78 of the jamming clamp pressure pad 58 by applying pressure to said longer arm from below makes the tensioned securing member free. Said operations are much simpler when locking cover plates 92 are used instead of the dowel holes 28. The shaft is to be placed into the cuts 108 then the locking cover plates 92 are embraced with the fingers and applying pressure on them, overcoming the resistance of said springs 102 and turning them to adjust them perpendicular to the axis of the rotation of the shaft. The knurled sides of the said locking cover plates 92 facilitate this operation. Releasing the locking cover plates causes the plates' protrusions 96 to enter automatically into the hollows 112 of the cuts. Releasing the locking cover plates causes the plates' protrusions 96 to enter automatically into the hollows 112 of the cuts 108. Simultaneously, the protrusions 94 slide underneath of the sides of the protrusions 110 of the cuts 108. The locking cover plates 92 are placed closer to the shaft 14a thanks to the slants 114 of the protrusions 94 and of the circular shaped niches 116 of the locking cover plates 92. Said locking cover plates are held in position, thereby maintaining the shaft connected with the handle with built-in a ratchet wrench. This position allows the carrying of the fastened object. Converse operation causes the protrusions 96 to exit the hollows 112 then turning the cover plates until they reach the parallel position against the shaft 14a. This operation allows the shaft 14a to be taken out from the cuts 108, thereby disconnecting the tightening device from the jamming clamp bed plate 12a. The bed plates 12 and 12a with the dowel holes 28 as well as with the locking cover plates 92 allow the use of the ratchet or an ordinary wrench. The FIG. 6 represents the realization of this idea.

What is claimed is:

1. A tightener, that is a device used with a variety of securing members for fastening a selected securing member around an object comprising:

A tightening device tightening a securing member and temporarily connected with a jamming clamp which is in modified form of an ordinary clamp, one end of the securing member is permanently connected with said ordinary clamp and said securing member fastened around an object and its free end previously threaded through a passage between knurled elements of the ordinary clamp is pulled by hand, and said securing member exiting said ordinary clamp is automatically jammed in said ordinary clamp when pulling is stopped and said ordinary clamp after modification is further named the jamming clamp to distinguish one clamp from the other and said modification is done to enable a connection of said jamming clamp with the tightening device which comprises:

a handle and built-in a ratchet mechanism in a handle's arm and said handle operating as a lever actuating the ratchet mechanism connected with a shaft turning it causing winding of the securing member onto said shaft which means a continuation pulling the securing member previously pulling by hand said securing member exiting the jamming clamp to reach a needed tension in said securing member and said securing member is automatically jammed in the jamming clamp when pulling is stopped and the handle can be used for carrying fastened object or said handle can be disconnected which means disconnecting the tightening device from the jamming clamp when the object is destined for transportation only and not for carrying;

means for the tightening device for pulling the securing member exiting the jamming clamp;

means for connecting the tightening-device with the jamming clamp and disconnecting from said jamming clamp;

means for the jamming clamp for maintaining the securing member in tensioned state, and also for loosening it;

means for the jamming clamp which allow for fast exchanging one kind of the securing member for another one means for elongating the handle for increasing the torque applied to the ratchet mechanism.

2. The tightener according to claim 1 wherein said tightening device comprises the handle provided with an ordinary ratchet wrench that is a ratchet mechanism built into a body attached to the handle arm, or being an integral part of the handle, and the shaft with a sleeve slid over said shaft winding onto itself the securing member; a dead hole formed in a head of the shaft of identical shape and dimension with a working tip of the ratchet mechanism inserted in said dead hole to turn said shaft with the ratchet mechanism; two cylindrical glass-shaped tubes and of said tubes external diameter of their ends the same as a diameter of dowel holes made in side walls of a jamming clamp bed plate and one of said cylindrical tubes with its external surface moving along a bore chamber made in the body attached to the handle arm and with its internal surface is movable along a head of the shaft, and in said tube's hole is placed a coil spring slid over the shaft and compressed between said head of the shaft and a ring shaped bottom of said tube's hole; the second tube placed in the handle's arm opposite to the handle's arm with the ratchet mechanism, and said tube's end opposite to its end entering the dowel hole is movable with its external surface along a hole made in a body attached to said arm of the handle opposite to the handle arm with the ratchet mechanism or being an integral part of the handle; a coil spring placed in said body's hole slid over the shaft and compressed between a ring shaped bottom of said body's hole and a ring shaped front surface of the tube, and the hole in said bottom of the body's hole is a bearing of a distal end of the shaft, but main bearings of the shaft are holes in bottoms of both tubes holes creating ring shaped surfaces which are pressed by coil springs and both said tubes at both arms of the handle, pulled off with use of their collars for uncovering the shaft allowing to put said shaft in the dowel holes of the jamming clamp bed plate, and releasing said collars thereby releasing the coil springs to cause the tubes' ends entering said dowel holes connecting the tightening device with the jamming clamp bed plate thereby enabling putting the handle into swinging motion actuating the ratchet mechanism turning the shaft winding onto itself the securing member, and also to use the handle for carrying fastened object, or detaching said tightening device from the jamming clamp with jammed securing member when an object is prepared for transportation only not for carrying it.

3. The tightener according to claim 2 wherein a tightening means for tightening a second end of the securing member or one of two securing members when both are provided with arresting hooks for restraint of load during its transportation, and said tightener is not used for carrying an object, comprises only the shaft with a sleeve slid over said shaft which constitute a working part of an ordinary ratchet wrench or constitute independent part with the dead hole formed in the shaft end, and said dead hole of the same shape and dimension as a working tip of the ordinary ratchet wrench; said shaft with its sleeve of the same length as the distance between side walls of the jamming clamp bed plate is put into U-shaped cuts formed in said side walls of the jamming clamp bed plate of the same width as the diameter of the shaft turned by the ratchet wrench winding onto itself the securing member exiting the jamming clamp to reach needed tension in said securing member jammed in said jamming clamp automatically when pulling it is stopped and the securing member is held in tensioned state by the jamming clamp and said shaft with its sleeve and the ratchet wrench taken out from said cuts as means completely unnecessary during transportation of the fastened object.

4. The tightener means according to claim 1 wherein the jamming clamp of said tightener comprises said means loosening the securing member jammed in a passage of the jamming clamp by lifting a longer arm of a jamming clamp's pressure pad which makes said passage bigger and said passage is created as a space between a knurled cam-shaped ending of a pressure pad shorter arm, and the same knurled edge of the jamming clamp bed plate, and the longer arm of the pressure pad is placed between the jamming clamp bed plate's side walls; a free end of a securing member as an alternative to the securing member permanently attached to the jamming clamp bed plate; said free end of the securing member entering the jamming clamp through a slot made in the bottom of the jamming clamp bed plate, wrapping around a bolt and exiting the jamming clamp through the same slot; said bolt with its ends moving along canals made in the side walls of the U-shaped jamming clamp bed plate and said securing member being pulled towards said slot to be jammed between the edge of said slot and said bolt; such manner for jamming the securing member constitutes a way for fast exchanging the securing member for another one which can be a tape of different length, or width, even an ordinary string or set of strings.

5. The tightener means according to claim 1 wherein the means elongating the handle of the tightener to reach much greater torque applied to the ratchet mechanism turning the shaft, and said handle comprises an extra lever pivotally connected with one of the handle's arm overlying the handle and in the time of using it is in upright position, perpendicular to the axis of the shaft, or another version which is a handle shaped cover-plate with its arms moving along external sides of the handle's arms.

6. The tightener as a device for use with a variety of securing members for fastening a selected securing member around an object comprises: two movable locking cover plates which maintain a shaft of the tightening device in the connected position with an U-shaped jamming clamp bed plate and thus maintaining the shaft located in cuts formed at both sides of the jamming clamp bed plate, and said tightener comprises means for enabling the adjusting of the position of the movable locking cover plates in order to maintain the tightening device containing the shaft and the handle with a built-in the ratchet mechanism in its arm in connection with the jamming clamp bed plate.

7. The tightener means according to claim 6 wherein said two movable locking cover plates maintain the tightening device in connection with the jamming clamp bed plate, said movable locking cover plates have channels in the shape of an elongated nletter O, formed along said movable locking cover plates and fixing head bolts pass through the channels of the movable locking cover plates, one of the fixing head bolts passes through the channel of one of said movable locking cover plates, the second fixing head bolt passes through the channel of second movable locking cover plate, which enable said movable locking cover plates to move along a straight line and simultaneously swiveling around the bolts, and heads of the bolts are placed in widened parts of the said channels equal or slightly wider than the diameter of the bolts' heads.

8. The tightener according to claim 6 wherein said means for enabling adjusting of the position for the movable locking cover plates towards the sides of the U-shaped jamming clamp bed plate, comprises said fixing head bolts passed through the channels formed along said movable locking cover plates and screwed into top surfaces of two sides of the U-shaped jamming clamp bed plate, one of said fixing head bolts is screwed into top surface of one side of said jamming clamp bed plate, the second fixing head bolt is screwed into top surface of the second side of the jamming clamp bed plate, and said two sides of the jamming clamp bed plate are lowered to the level of the shaft, which means that the portion of the jamming clamp bed plate's are lowered at one side of the cuts where the movable locking cover plates are mounted and the fixing head bolts are screwed, and said shaft is placed is the cuts formed in both sides of the jamming clamp bed plate; double protrusions at the movable locking cover plates' ends entering and upper ones of said double protrusions of the locking cover plates' ends entering into wedge shaped hollows in protrusions which are formed in said internal surfaces of the cuts and simultaneously the lower ones of said double protrusions of the movable locking cover plates' ends with their inclined surface are placed underneath said protrusions formed in the walls of the cuts enabling the bolts' heads of the movable locking cover plates to maintain the shaft in position, thereby to maintain the tightening device in position allowing to carry the fastened object; embracing knurled sides of the movable locking cover plates with one's fingers facilitate overcoming the resistance of two flat springs attached to front surfaces of the said lower sides of thickened parts of the jamming clamp bed plate, constantly pressing onto the movable locking cover plates which automatically cause entering of said upper wedge shaped protrusions of the movable locking cover plates into appropriately shaped hollows in the protrusions in the walls of the cuts and simultaneously placing the lower parts of the protrusions of the movable locking cover plates with their inclined surfaces underneath the said protrusions in the walls of the cuts, thereby circular shaped niches formed at the undersides of the movable locking cover plates cause creating bigger adhering surfaces to the shaft.

* * * * *